US008980996B2

(12) United States Patent
Vergelati et al.

(10) Patent No.: US 8,980,996 B2
(45) Date of Patent: Mar. 17, 2015

(54) MODIFIED POLYAMIDE COMPOSITION COMPRISING AT LEAST ONE PHENOLIC COMPOUND

(75) Inventors: Caroll Vergelati, Saint Baudille de la Tour (FR); Olivier Andres, Mions (FR)

(73) Assignee: Rhodia Operations, Aubervilliers (FR)

( * ) Notice: Subject to any disclaimer, the term of this patent is extended or adjusted under 35 U.S.C. 154(b) by 0 days.

(21) Appl. No.: 13/381,803

(22) PCT Filed: Jun. 22, 2010

(86) PCT No.: PCT/EP2010/058775
§ 371 (c)(1),
(2), (4) Date: Dec. 30, 2011

(87) PCT Pub. No.: WO2011/000735
PCT Pub. Date: Jan. 6, 2011

(65) Prior Publication Data
US 2012/0108763 A1 May 3, 2012

(30) Foreign Application Priority Data
Jun. 30, 2009 (FR) ...................... 09 54445

(51) Int. Cl.
*C08L 77/02* (2006.01)
*C07C 69/84* (2006.01)
*C08K 5/01* (2006.01)
*C08K 5/132* (2006.01)
*C08K 5/134* (2006.01)

(52) U.S. Cl.
CPC ............... *C08K 5/132* (2013.01); *C08K 5/1345* (2013.01)
USPC ........... 524/538; 525/420; 525/427; 525/429; 525/516

(58) Field of Classification Search
CPC ........ C08G 69/02; C08G 69/04; C08G 69/08; C08G 69/10; C08G 69/12; C08G 69/14; C08G 69/16; C08G 69/26; C08G 69/28; C08G 69/36; C08G 69/38

USPC ................... 525/420, 427, 429, 516; 524/538
See application file for complete search history.

(56) References Cited

U.S. PATENT DOCUMENTS

| 5,084,310 A * | 1/1992 | Hisazumi et al. ............ 428/34.8 |
| 5,102,935 A | 4/1992 | Heinz et al. |
| 5,354,789 A * | 10/1994 | Kamikado ..................... 523/420 |
| 5,959,069 A | 9/1999 | Glueck et al. |
| 2004/0214963 A1 | 10/2004 | Iwata et al. |
| 2011/0251341 A1 * | 10/2011 | Touraud et al. ................ 524/606 |

FOREIGN PATENT DOCUMENTS

| CN | 101 117 436 A | | 2/2008 |
| EP | 0591054 A1 | * | 4/1994 |
| EP | 0 682 057 A1 | | 11/1995 |
| EP | 0 632 703 B1 | | 2/1999 |
| EP | 0 974 575 A1 | | 1/2000 |
| EP | 0 832 149 B1 | | 7/2000 |
| EP | 1 251 148 A1 | | 10/2002 |
| FR | 2 743 077 A1 | | 7/1997 |
| FR | 2 779 730 A1 | | 12/1999 |
| GB | 2 227 748 A | | 8/1990 |
| JP | 2002284872 A | * | 10/2002 |
| WO | WO 99/03909 A1 | | 1/1999 |
| WO | WO 00/68298 A1 | | 11/2000 |

OTHER PUBLICATIONS

International Search Report (PCT/ISA/210) issued on Oct. 4, 2010, by French Patent Office as the International Searching Authority for International Application No. PCT/EP2010/058775.

* cited by examiner

*Primary Examiner* — Ana Woodward
(74) *Attorney, Agent, or Firm* — Dentons US LLP

(57) ABSTRACT

A phenolic compound for manufacturing a modified polyamide that has an increased degree of crystallinity is described. A polyamide composition comprising at least one such phenolic compound and optionally reinforcing fillers or extenders is also described. The composition is preferably a composition to be molded, for example in the form of granules or powder, that is used for the manufacture of articles by an injection-molding process.

20 Claims, No Drawings

MODIFIED POLYAMIDE COMPOSITION COMPRISING AT LEAST ONE PHENOLIC COMPOUND

This application is the United States national phase of PCT/EP2010/058775, filed Jun. 22, 2010, and designating the United States (published in the French language on Jan. 6, 2011, as WO 2011/000735 A1; the title and abstract were also published in English), which claims priority of FR 0954445, filed Jun. 30, 2009, each hereby expressly incorporated by reference in its entirety and each assigned to the assignee hereof.

The present invention relates to the use of a phenolic compound for manufacturing a modified polyamide that has an increased degree of crystallinity. The invention also relates to a polyamide composition comprising at least one such phenolic compound and optionally reinforcing fillers or extenders. The composition is preferably a composition to be molded, for example in the form of granules or powder, that is used for the manufacture of articles by an injection-molding process.

Engineering polyamides are used for making numerous articles in various fields, such as automobiles, where specific properties of rigidity, impact strength, dimensional stability, especially at relatively high temperature, surface appearance, density and weight are particularly in demand. The choice of a material for a given application is generally guided by the level of performance required with respect to certain properties and by its cost. In fact there is always a demand for new materials that are able to meet the specifications in terms of performance and/or costs.

The applicant has now discovered, quite surprisingly, that the use of a particular phenolic compound in a polyamide composition made it possible to obtain new compromises of properties for controlling dimensional stability, giving the material better inhibition of water absorption, better barrier properties against radical diffusion and greater fluidity for processing in the molten state. It appears in fact that the particular phenolic compound according to the invention would act as an agent for increasing the degree of crystallinity of the polyamide.

The present invention thus relates to a polyamide composition comprising at least one polyamide and a compound of formula (I), and optionally reinforcing fillers or extenders and optionally additives that are used conventionally in this area.

The invention also relates to the use of a compound of formula (I) as agent for increasing the degree of crystallinity of the polyamide. The invention thus also relates to the use of a compound of formula (I) for manufacturing a modified polyamide that has an increased degree of crystallinity.

The invention also relates to the use of a compound of formula (I) for enhancing the barrier properties of a polyamide composition.

The invention further relates to the use of a compound of formula (I) for reducing the water uptake of a polyamide composition.

The invention also relates to the use of a compound of formula (I) for increasing the melt fluidity of a polyamide composition.

The composition is preferably a composition to be molded, for example in the form of granules or powder, that is used for the manufacture of articles by an injection-molding process.

The phenolic compound of the invention is represented by formula (I):

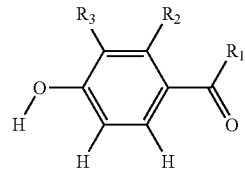

in which the groups $R_1$, $R_2$ and $R_3$ represent, independently of one another, a hydrogen atom, a hydroxyl group, a linear or branched alkyl group comprising 1 to 20 carbon atoms optionally comprising heteroatoms, an aryl group comprising 1 to 20 carbon atoms optionally comprising heteroatoms, or a group $N_nH_{n+1}$ in which n is equal to 1 or 2.

It is to be understood that the aryl group can be substituted, notably with alkyl chains.

Preferably the linear or branched alkyl group or aryl group comprises from 1 to 6 carbon atoms. Preferably the heteroatoms are oxygen or nitrogen.

$R_1$, $R_2$ and $R_3$, independently of one another, can correspond to a hydrogen atom, a hydroxyl, an $NH_2$, an $N_2H_3$, a methyl, an ethyl, a methoxy, an ethoxy, or a benzene.

Preferably, $R_1$ is hydrogen atom, a hydroxyl group, a methoxy, an $NH_2$, a methyl, a group $N_2H_3$, or a benzyl.

Preferably $R_3$ is a hydrogen atom, a methoxy or an ethoxy.

Preferably $R_2$ is a hydrogen atom.

The compounds of formula (I) for which $R_1$ is a hydrogen atom are notably preferred.

The compounds of formula (I) are quite preferably selected from the group comprising: vanillin [121-33-5], vanillic acid [121-34-6], methyl vanillate [3943-74-6], ethyl vanillin [121-32-4], 4-hydroxy-benzaldehyde [123-08-0], 4-hydroxy-benzoic acid [99-96-7], 4-hydroxy acetophenone [99-93-4], 4-hydroxy-benzoic hydrazide [5351-23-5], 4-hydroxy-benzophenone [1137-42-4], 4'-hydroxy-3'-methoxy acetophenone [498-02-2], and 4-hydroxy-benzamide [619-57-8].

Mixtures of compounds of formula (I) can notably be used for preparing the composition according to the invention.

The polyamide composition according to the invention generally comprises from 1 to 15 wt. % of compound of formula (I), preferably from 4 to 8 wt. %, relative to the total weight of the composition.

According to the present invention, the polyamide composition can be obtained in various known ways for incorporating fillers and additives in a polyamide composition.

It can for example be manufactured by adding the compound of formula (I) during polymerization of the polyamide in the molten state, in the presence of the monomers of the polyamide. The compound of formula (I) can also be added in the hot mixture with the polyamide, notably formed or partially formed, for example in the extruder, notably with other compounds. The compound of formula (I) can also be added in the solid state, notably during post-condensation of the polyimide.

The polyamide of the invention can be a semicrystalline or amorphous polyamide or copolyamide, such as aliphatic polyamides, semiaromatic polyamides and, more generally, linear polyamides obtained by polycondensation between an aliphatic or aromatic diacid, and an aromatic or aliphatic primary diamine, the polyamides obtained by condensation of a lactam, of an amino acid or the linear polyamides obtained by condensation of a mixture of these various monomers.

More precisely, these copolyamides can be, for example, hexamethylene polyadipamide, polyphthalamides obtained from terephthalic and/or isophthalic acid, copolyamides obtained from adipic acid, from hexamethylene diamine and from caprolactam.

The polyamide is preferably selected from the group comprising the polyamides obtained by polycondensation of at least one linear dicarboxylic acid with a linear or cyclic diamine such as PA 6.6, PA 6.10, PA 6.12, PA 12.12, PA 4.6, or between at least one aromatic dicarboxylic acid and a linear or aromatic diamine such as polyterephthalamides, polyisophthalamides, polyaramids, the polyamides obtained by polycondensation of at least one amino acid on itself, the amino acid possibly being generated by hydrolytic opening of a lactam ring such as, for example PA 6, PA 7, PA 11, PA 12.

The composition of the invention can also comprise the copolyamides derived notably from the above polyamides, or the mixtures of these polyamides or copolyamides.

The preferred polyamides are selected from the group comprising: PA 66, PA 610, PA 612, PA 6.66, PA 46, MXD6, PA 66/6T, PA 6, PA 11, and PA 12.

Generally polyamides are used that have molecular weights suitable for injection molding processes, although polyamides with lower viscosities can also be used.

The polyamide can notably be a polymer comprising star or H macromolecular chains, connected, branched, hyperbranched, and if applicable, linear macromolecular chains. Polymers comprising said star or H macromolecular chains are described for example in documents FR2743077, FR2779730, US5959069, EP0632703, EP0682057 and EP0832149.

The polyamide can be a polymer of the random tree type, preferably a copolyamide having a random tree structure. These copolyamides of random tree structure and the method of obtaining them are notably described in document WO99/03909. The matrix of the invention can also be a composition comprising a linear thermoplastic polymer and a star, H and/or tree thermoplastic polymer as described above. The matrix of the invention may also comprise a hyperbranched copolyamide of the type described in document WO 00/68298. The composition of the invention may also comprise any combination of linear, star, H, tree, hyperbranched copolyamide thermoplastic polymer as described above.

The composition according to the invention preferably has from 30 to 95 wt. % of polyamide, preferably from 40 to 80 wt. %, relative to the total weight of the composition.

The composition can also comprise, depending on the desired final property, a mixture of polyamide and one or more other polymers, such as for example another polyamide, polyethylene, polystyrene, polypropylene, ABS resin, polycarbonate, polyphenylene sulfide, polyphenylene oxide, polyacetal, polysulfone, polyethersulfone, polyetherimide, polyetherketone, a polylactic acid resin, a polysulfone resin, an elastomeric resin or mixtures thereof.

The reinforcing fillers or extenders according to the present invention can be for example fibrous fillers and/or non-fibrous fillers.

As fibrous fillers we may mention glass fibers, carbon fibers, natural fibers, aramid fibers, and nanotubes, notably of carbon. As natural fibers, we may mention hemp and flax. Among the non-fibrous fillers, we may notably mention all particulate fillers, lamellar fillers and/or exfoliating or non-exfoliating nanofillers such as alumina, carbon black, aluminosilicate clays, montmorillonites, zirconium phosphate, kaolin, calcium carbonate, diatoms, graphite, mica, silica, titanium dioxide, zeolites, talc, wollastonite, polymeric fillers such as, for example, particles of dimethacrylates, glass beads or glass powder.

It is perfectly possible according to the invention for the composition to comprise several types of reinforcing fillers. Preferably, the filler most used can be glass fibers, of the chopped type, notably having a diameter between 7 and 14 μm. These fillers can have a surface size that ensures mechanical adhesion between the fibers and the polyamide matrix.

The concentration by weight of the reinforcing fillers or extenders is advantageously between 1 and 60 wt. % relative to the total weight of the composition, preferably between 15 and 50 wt. %.

The composition according to the invention can further comprise additives used conventionally for manufacturing polyamide compositions. Thus, we may mention lubricants, fireproofing agents, plasticizers, nucleating agents, impact modifiers, catalysts, light and/or thermal stabilizers, antioxidants, antistatic agents, colorants, dulling agents, molding aids or other conventional additives.

Agents for modifying impact resistance can notably be added to the polyamide composition. Generally, polymers of elastomers can be used for this purpose. Agents for modifying resilience are generally defined as having an ASTM D-638 tensile modulus less than about 500 MPa. Examples of suitable elastomers are ethylene-acrylic ester-maleic anhydride, ethylene-propylene-maleic anhydride, EPDM (ethylene-propylene-diene monomer) optionally with a grafted maleic anhydride. The concentration by weight of elastomer is advantageously between 0.1 and 30% relative to the total weight of the composition.

Notably, impact modifiers are preferred that comprise functional groups that are reactive with the polyamide. We may for example mention terpolymers of ethylene, acrylic ester and glycidyl methacrylate, copolymers of ethylene and butyl ester acrylate, copolymers of ethylene, n-butyl acrylate and glycidyl methacrylate, copolymers of ethylene and maleic anhydride, styrene-maleimide copolymers grafted with maleic anhydride, styrene-ethylene-butylene-styrene copolymers modified with maleic anhydride, styrene-acrylonitrile copolymers grafted with maleic anhydrides, acrylonitrile butadiene styrene copolymers grafted with maleic anhydrides, and their hydrogenated versions. The proportion by weight of these agents in the total composition is notably between 0.1 and 40%.

These fillers and additives can be added to the modified polyamide by usual means appropriate to each filler or additive, for instance during polymerization or mixing in the melt.

The materials and compositions of the invention are generally obtained by hot mixing of the various constituents, for example in a single-screw or twin-screw extruder, at a temperature sufficient to keep the polyamide resin molten; or cold mixing, notably in a mechanical mixer. Generally, the mixture obtained is extruded in the form of rods, which are chopped into pieces to form granules. The compounds can be added at any time in the manufacturing process of the plastic, notably by hot or cold mixing with the plastic matrix. Addition of the compounds and additives, such as novolac resin, can be performed by adding these compounds to the molten plastic matrix in pure form or in the form of a concentrated mixture in a matrix, for example a plastic matrix.

The composition according to the invention can be used for any process for forming plastics, for instance molding processes, notably injection molding, rotational molding, sintering, casting, or extrusion processes such as blow extrusion and film extrusion, or spinning processes. The invention thus also relates to methods of manufacture of molded or extruded articles by forming a composition of the invention.

The present invention notably also relates to an injection-molding process in which a composition according to the invention is fed, notably in the form of granules, into a device for injection molding, and molding is carried out.

The use of the compositions according to the invention is particularly interesting in the context of the manufacture of articles for the automobile or electrical industry.

Specific wording is used in the description so as to facilitate understanding of the principle of the invention. It must, however, be understood that no limitation of the scope of the invention is envisaged by the use of this specific wording. Modifications, amendments and improvements can notably be envisaged by a person skilled in the art based on his own general knowledge.

The term "and/or" includes the meanings and, or, as well as all other possible combinations of the elements connected to this term.

Other details or advantages of the invention will become clearer from the examples given below, purely as illustration.

EXPERIMENTAL SECTION

Example 1

Manufacture of the Compositions

Compositions based on polyamide (PA 66 27AD1 from the company Rhodia, having an IV of 140 ml/g according to standard ISO 307) and with different proportions of vanillin ($R_1$=H, $R_2$=—$OCH_3$, $R_3$=H) are obtained by extrusion on a PRISM 25D twin-screw mini-extruder. The operating characteristics are as follows:

Twin-screw mini-extruder: PRISM 25D, with
a temperature profile: 275-280-275-275-275° C.
screw speed (rpm): 250
power of motor (N·m): 16
vacuum: −0.3 bar The rods emerging from the extruder are cast in a water-cooled tank and then granulated. Test specimens are made by injection molding as follows:
Mini Press BOY 12M, 12 tonnes, 18 mm screw
T (° C.) barrel: from 270 to 285
T (° C.) mold: 70
Injection speed (m/s): 100
Injection pressure (bar): 50
Holding pressure (bar): 25
Counter-pressure (bar): 3
Screw speed (rpm): 220

The test specimens are then conditioned at different degrees of hygrometry RH50 (RH=relative humidity).

Films of certain compositions are also directly employed at extruder outlet. A special die, called a slot die, is fitted to the nozzle. This makes it possible to produce extrudate in the form of a sheet with a width of 300 mm and a thickness from about ten microns to 1 mm, the thickness being adjustable manually over the whole width of the die by means of screws.

The cooling tank usually employed in "conventional" extrusion is replaced with a filmer composed of:
two chill-rolls: temperature-controlled rolls providing more or less rapid cooling of the film
six "support" rollers which simply guide the film
a double drive roller, the tension and speed of which can be adjusted
a winder roller, the torque of which can be adjusted and on which the finished product is stored
a compressed air inlet at the outlet of the slot die to control the cooling of the film Example 2

Analysis of the Formulations

Various tests were performed on the formulations produced in example 1.

The results are presented in Table 1 given below:

TABLE 1

| | RH | Absorption of water (wt. %) | Inhibition (%) | Young's Modulus (MPa) | Coeff. Diffusion ethanol (g/m²·d) | Melt viscosity at 100 s-1 (Pa·s) |
|---|---|---|---|---|---|---|
| C1: PA66 control | 0 | — | — | 2850 | 149 | 500 |
| | 50 | 2.90 | — | 1220 | nm | nm |
| 1: 1% | 0 | — | — | 2900 | nm | 110 |
| | 50 | 2.78 | 4 | 1230 | nm | nm |
| 2: 4% | 0 | — | — | 2990 | 42 | nm |
| | 50 | 2.48 | 14.4 | 1160 | nm | nm |
| 3: 8% | 0 | — | — | 3000 | nm | nm |
| | 50 | 1.89 | 35.0 | 1140 | nm | nm | nm = not measured

Absorption of water is measured according to standard ISO 1110.

Measurements of tension (Young's modulus) are performed according to standard ISO 527.

The measurements of capillary rheometry, which give access to the rheological properties, are performed according to standard ISO 11443.

The tests of permeability to ethanol diffusion (at 40° C. and RH0) are performed in order to evaluate the capacity of the different compositions to prevent the diffusion of solvents or mixture of solvents. The principle consists of depositing a square of film of 50*50*0.15 $mm^3$ on a cell containing a certain amount of solvent, pure ethanol in the present case. The film will close the cell after tightening four screws. The cell is weighed at regular time intervals to monitor the variation of weight loss. The measurements can be carried out under a hood at ambient temperature and RH, or in a stove at controlled temperature and RH: 40° C. and RH0 in the present case. The value of the slope of the straight line obtained by monitoring the variation in weight loss as a function of time is that of the coefficient of intrinsic diffusion of the substance under investigation in the composition in question, in the specified conditions of temperature and hygrometry.

It should be noted that in the same conditions the use of 4 wt. % of vanillic alcohol gives a water uptake of 2.81 wt. % and that the use of 8 wt. % of vanillic alcohol gives a water uptake of 2.58 wt. %; relative to a control comprising only polyamide 66 which gives a water uptake of 2.90 wt. % (50% RH for all these tests).

The invention claimed is:

1. A method of manufacturing a polyamide composition comprising at least one polyamide and a compound of formula (I):

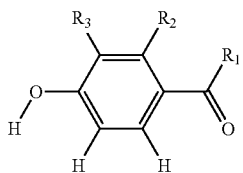

in which $R_1$ is a hydrogen atom, a methoxy, an $NH_2$, a methyl, $N_2H_3$, or a benzene, $R_2$ is a hydrogen atom, and $R_3$ is methoxy or an ethoxy, wherein the polyamide is selected from the group consisting of PA 66, PA 610, PA 612, PA 6.66, PA 46, MXD6, PA 66/6T, PA 6, PA 11, and PA 12, and wherein said composition comprises from 1% to 15% by weight of compound of formula (I), relative to the total weight of the composition;

said method comprising adding said compound of formula (I) during polymerization of said polyamide in the molten state, in the presence of the monomers of the polyamide.

2. The method as claimed in claim 1, wherein $R_1$ in the compound of formula (I) is a hydrogen atom.

3. The method as claimed in claim 1, wherein the compound of formula (I) is selected from the group consisting of vanillin, methyl vanillate, ethyl vanillin and 4'-hydroxy-3'-methoxy acetophenone.

4. The method as claimed in claim 1, wherein the composition comprises from 1 wt. % to 8 wt. % of compound of formula (I), relative to the total weight of the composition.

5. The method as claimed in claim 1, wherein the polyimide is selected from the group consisting of: PA 66, PA 6.66, and PA 6.

6. The method as claimed in claim 1, wherein the composition comprises from 30 wt. % to 95 wt. % of polyamide, relative to the total weight of the composition.

7. The method as claimed in claim 1, further comprising incorporating reinforcing fillers or extenders into the composition.

8. A method for manufacturing a molded or extruded article, the method comprising forming a polyamide composition according to the method as claimed in claim 1 and molding or extruding the polyamide composition to obtain a molded or extruded article.

9. The method as claimed in claim 1, wherein the resultant polyamide composition has an increase in the degree of crystallinity, relative to the corresponding polyamide composition free of the compound of formula (I).

10. The method as claimed in claim 1, wherein the resultant polyamide composition has enhanced barrier properties, relative to the corresponding polyamide composition free of the compound of formula (I).

11. The method as claimed in claim 1, wherein the resultant polyamide composition has a reduction in water uptake, relative to the corresponding polyamide composition free of the compound of formula (I).

12. The method as claimed in claim 1, wherein the resultant polyamide composition has an increase in melt fluidity, relative to the corresponding polyamide composition free of the compound of formula (I).

13. The method as claimed in claim 1, wherein the resultant polyamide composition has an increase in crystallinity, an enhancement in barrier properties, a reduction in water uptake or an increase in melt fluidity, relative to a comparable composition not comprising a compound of formula (I).

14. A method of manufacturing a polyimide composition comprising at least one polyamide and a compound of formula (I):

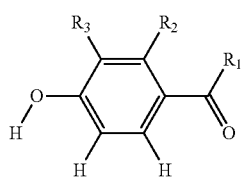

in which $R_1$ is a methoxy, an $NH_2$, or $N_2H_3$, $R_2$ is a hydrogen atom, and $R_3$ is a hydrogen atom, a methoxy, or an ethoxy, wherein the polyamide is selected from the group consisting of PA 66, PA 610, PA 612, PA 6.66, PA 46, MXD6, PA 66/6T, PA 6, PA 11, and PA 12, and wherein said composition comprises from 1% to 15% by weight of compound of formula (I), relative to the total weight of the composition;

said method comprising adding said compound of formula (I) during polymerization of said polyamide in the molten state, in the presence of the monomers of the polyamide.

15. The method as claimed in claim 14, wherein the compound of formula (I) is selected from the group consisting of 4-hydroxy-benzoic hydrazide and 4-hydroxy-benzamide.

16. The method as claimed in claim 14, wherein the composition comprises from 1 wt. % to 8 wt. % of compound of formula (I), relative to the total weight of the composition.

17. The method as claimed in claim 14, wherein the polyamide is selected from the group consisting of: PA 66, PA 6.66, and PA 6.

18. The method as claimed in claim 14, wherein the composition comprises from 30 wt. % to 95 wt % of polyamide, relative to the total weight of the composition.

19. The method as claimed in claim 14, further comprising incorporating reinforcing fillers or extenders into the composition.

20. A method for manufacturing a molded or extruded article, the method comprising forming a polyimide composition according to the method as claimed in claim 14 and molding or extruding the polyimide composition to obtain a molded or extruded article.

* * * * *